INVENTORS
JOHN R. CARTHEW
EDWARD LOIZIDES
LOUIS A. MITTA

BY John F. Osterndorf
ATTORNEY

Nov. 21, 1967 J. R. CARTHEW ETAL 3,354,450

DATA TRANSLATION APPARATUS

Filed June 23, 1964 5 Sheets-Sheet 3

United States Patent Office 3,354,450
Patented Nov. 21, 1967

3,354,450

DATA TRANSLATION APPARATUS

John R. Carthew, Rhinebeck, Edward Loizides and Louis A. Mitta, Poughkeepsie, N.Y., assignors to International Business Machines Corporation, New York, N.Y., a corporation of New York Filed June 23, 1964, Ser. No. 377,357
14 Claims. (Cl. 340—347)

ABSTRACT OF THE DISCLOSURE

Data translation apparatus is provided for accomplishing the forward or backward translation of a character of information expressed in a first code to the same character of information expressed in a second code. A character of the first code is supplied to the apparatus for translation into the second code. A comparison is performed between the address of the character submitted for translation and the address of the same character as stored in a storage medium and expressed in the first and second codes. When this comparison occurs between the character entered into the translator and the same character with the same code as stored in the medium the translation is effected to the corresponding character expressed in the second code. The storage medium in the translator stores the characters in slots equivalents to the number of characters stored. Each slot contains each character as expressed in each of the stored codes.

Figure 1:
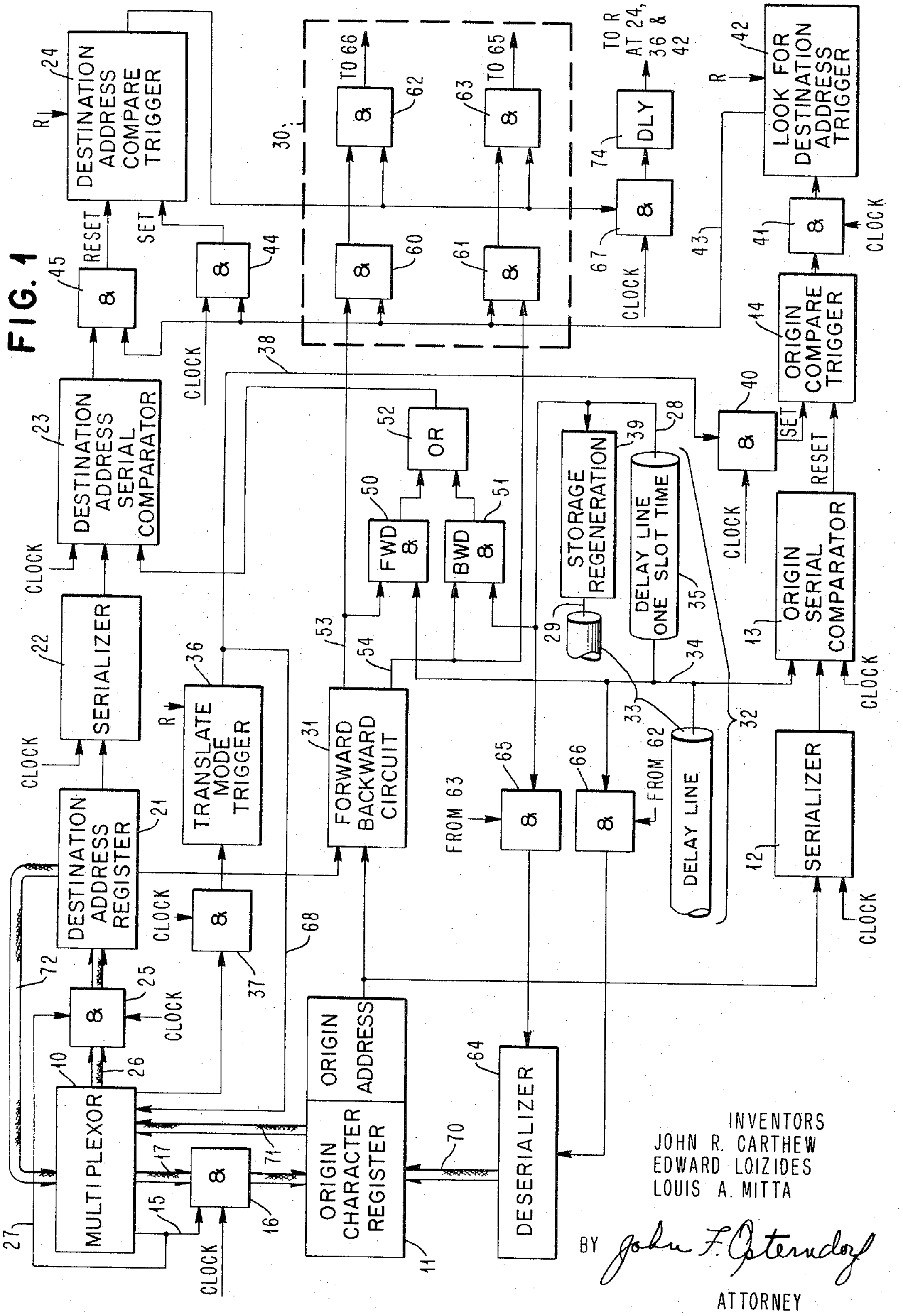

This invention relates to information handling apparatus and, more particularly, to a data translation system for converting manifestations of information expressed in one code into an expression of the same information in a second code.

In present day data processing and communicating systems, the necessity often arises for translating among the manifestations of information as expressed in various codes. This is particularly true in systems having a number of different communication units connected to operate together. Often the units employ different data codes and are multiplexed into the data processing equipment which utilizes still another code. In such instances, translation of the data must be accomplished among the various codes so that the uniform signal code of the data processing equipment is employed. On the other hand, where information is transferred from the data processing equipment to a particular communication unit it is then necessary to translate from the data processing code to the code of the particular communication unit.

Accordingly, it is a general object of the invention to provide an improved data translation system for converting among the various codes employed in data processing and communicating systems.

Code translators are of many types and include those which employ a storage medium for storing the various codes. The translators of this type fall into two categories. The first category stores the initial and final codes permanently in the storage medium, and the second category permanently stores one of the codes and utilizes other circuitry for storing or generating the other code. The translator of this invention falls into the first category. In such a translator, the characters entered into the translator in one code are compared with the characters of the same code in the storage medium. When a comparison condition occurs, the location of the desired code in the storage medium is determined and the conversion accomplished.

Thus, according to one aspect of the invention, it is another object of the invention to provide code storage and location apparatus to effect the translation of information between particular codes.

It is a further object of the invention to provide code translation apparatus which does not require a specific translation starting point among the stored codes in order to commence the translation.

Another object of the invention is to provide an improved code translator which converts information expressed in one code in a character by character manner into the same information expressed in a second code.

A further object of the invention is to provide a code translator which accomplishes the translation of information among a plurality of separate and distinct codes.

Yet a further object of the invention is to provide a code translator which is capable of translating among plural codes where the number of bits per character differs between the codes and where the character sets are not necessarily complete.

Briefly, according to one aspect of the invention, there is provided a translator for accomplishing the conversion of a character of information expressed in a first code to the same character of information expressed in a second code. Means are provided for retaining a character of the first code which is supplied to the translator for conversion into a second code. These means are connected to comparing means along with the medium in the translator for storing the characters expressed in the first and second codes. When a comparison occurs between the character entered into the translator and the same character with the same code as stored in the medium, control means are actuated to effect the translation of the character into the corresponding character expressed in the second code. The medium in the translator for storing the character expressed in the codes is divided into slots at least equivalent in number to the number of characters stored. Each character as expressed in each of the codes is stored in one of the slots.

According to one feature of the invention, the storage medium is of the closed loop type and is provided with a tapped output which is one slot time before the normal output from the medium. A plurality of separate and distinct codes are arranged to be stored by characters in the slots of the medium. Through the use of the tapped and normal outputs and the control means, translation is accomplished in both forward and backward directions among the stored codes. The different codes include address or code identifier bits and data bits and the character lengths may be unequal or the sets of characters may be incomplete.

In the translator according to this feature, the conversion from one code to another entails the pairing of the two code characters and a determination of whether the conversion is occurring in a backward or forward direction. The comparison is performed in a serial manner between a character entered into an input register and the contents of the storage medium. When a comparison occurs, the corresponding character in the new code is removed from the storage medium and the conversion is complete. The comparison of the characters is performed at the tapped output of the storage medium to insure that the translated character is always available after the comparison occurs.

According to another feature of the invention, the use of redundancy principles is employed in storing the codes in the storage medium. Each slot of the medium contains a character expressed in each code representation. In addition, the first code representation in each slot is repeated as the last representation in that slot. Thus, if the bit count per character is the same for both codes stored in the medium, each slot contains three code representations, for example A1, B1, A1 and then A2, B2, A2. In the translator according to this feature, code conversion between slots is prohibited and, therefore, if an equal comparison occurs at the last representation of a slot, it is ignored and the comparing is continued. Repetition of the first code representation permits bilateral translation to take place between two codes. In both instances, the next code representation out of the storage medium is the desired one.

Although the translator according to this feature has been described for use where the bit counts per character are equal for both codes, this system may also be employed where the bit count per character differs between the codes. To accommodate unequal bit counts for the same character, a shift code is added to one of the codes with shift bits being added dependent upon the numerical bit difference between the two codes. Regardless of whether the bit counts differ between the codes, the first code representation is repeated in the last position of a slot. This always insures that the next code representation out of a slot within the storage medium after a comparison occurs is an indicia of the same character with the desired code. External circuitry may then be employed to effect a change to the actual desired character.

Figure 2A:
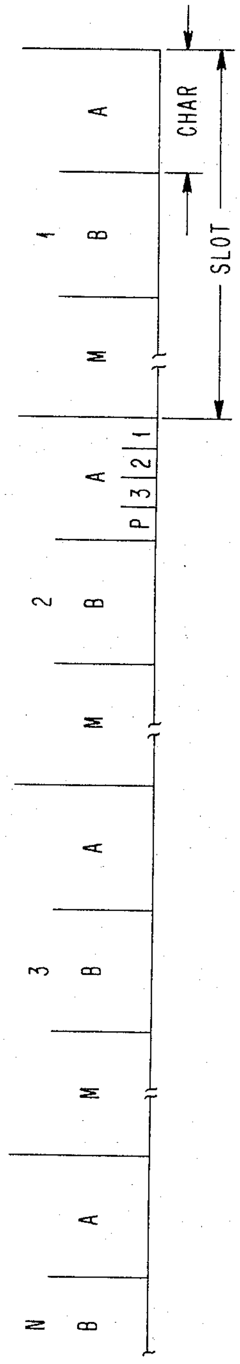
Figure 2B:
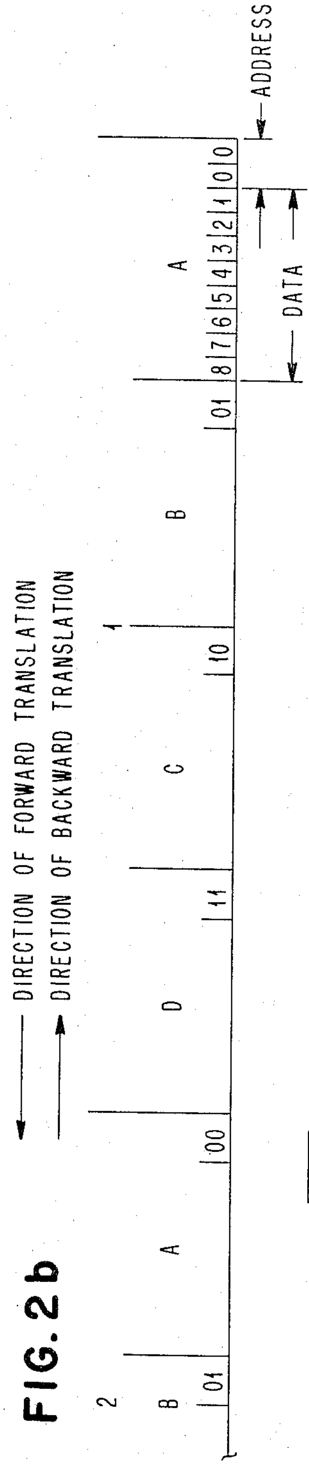
Figure 3B:
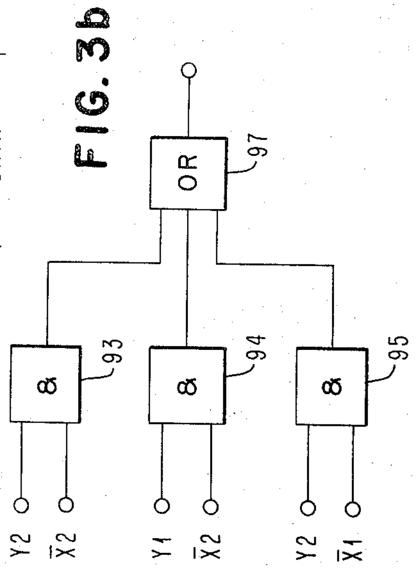
Figure 3A:
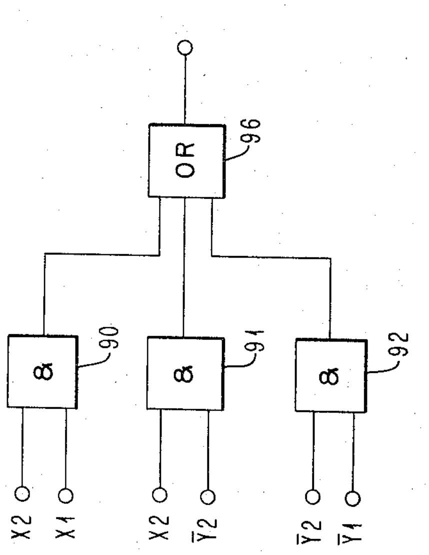
Figure 4A:
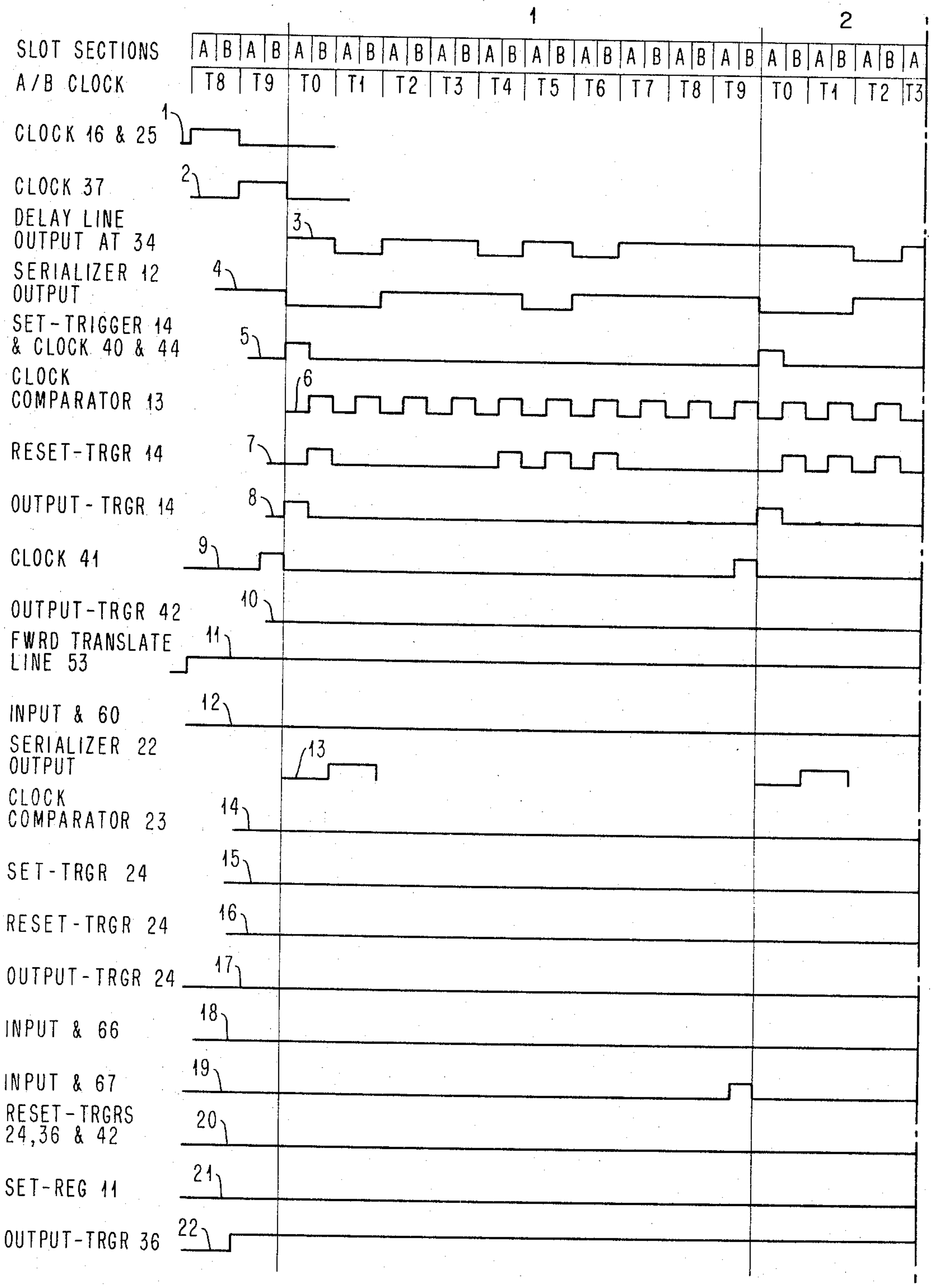
Figure 4B:
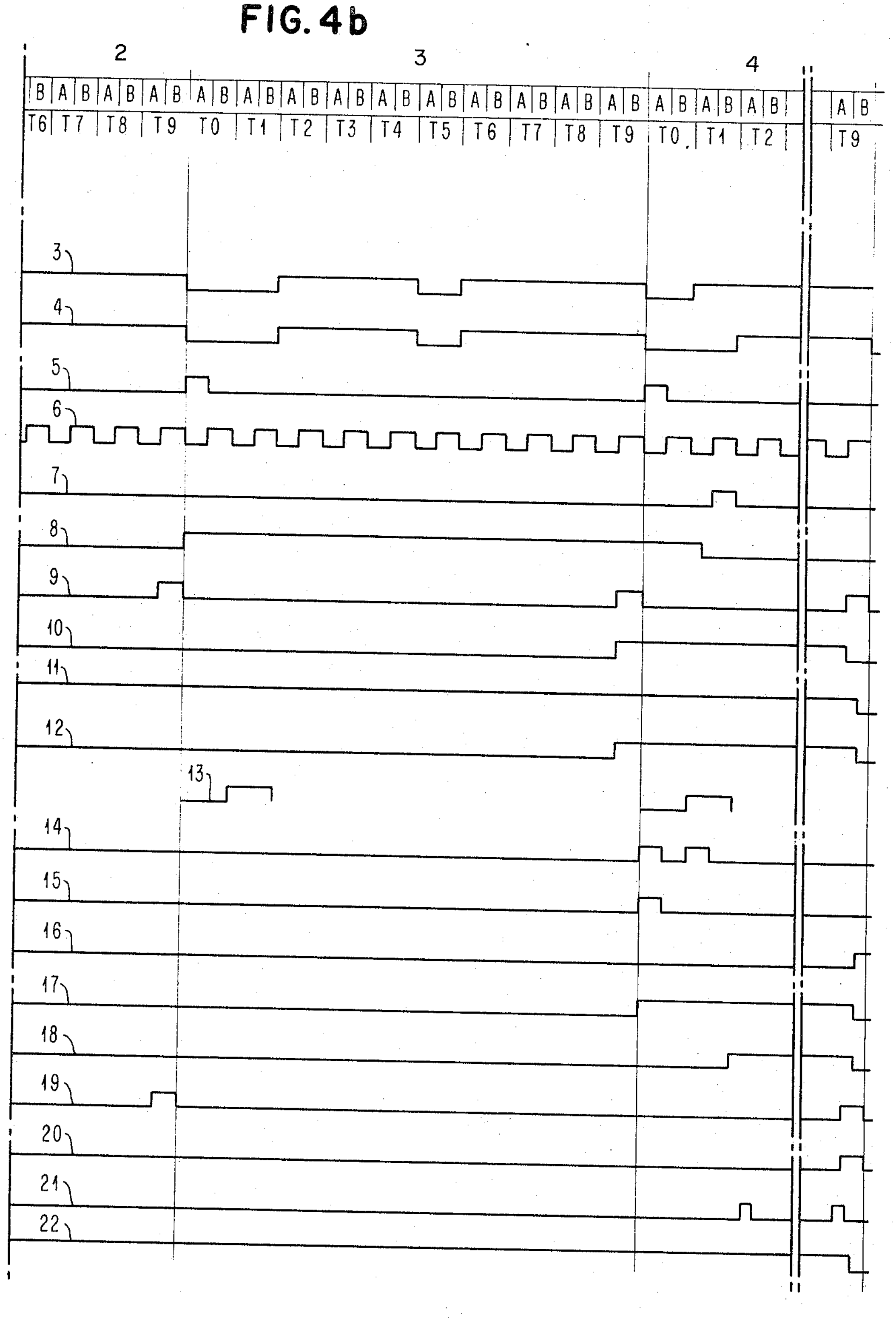
Figure 5:
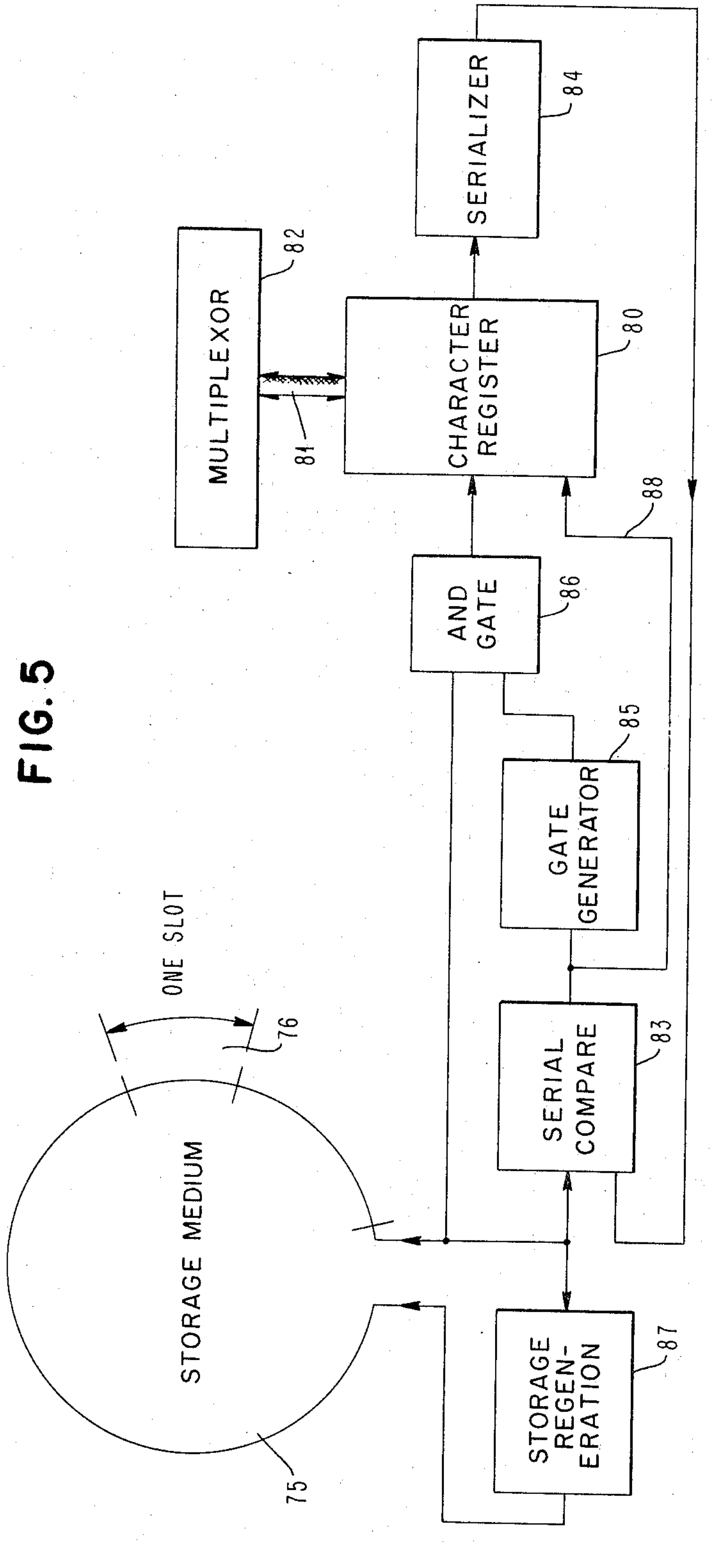
Figure 6:
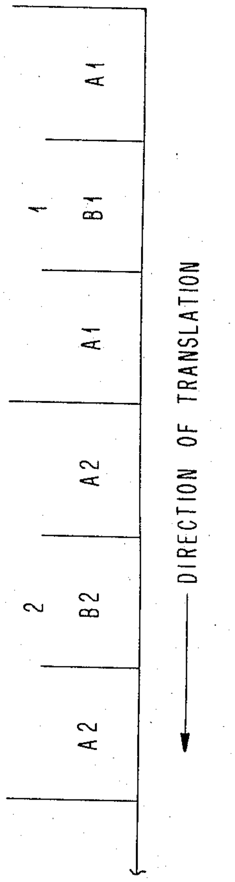

The foregoing and other objects, features and advantages of the invention will be apparent from the following more particular description of the preferred embodiments of the invention as illustrated in the accompanying drawings; wherein:

FIGURE 1 is a block diagram of a code translator embodying the principles of the invention;

FIGURE 2*a* is a diagram illustrating how a portion of the storage medium employed in the embodiment of FIGURE 1 has the various coded characters stored in it;

FIGURE 2*b* is a diagram illustrating how one slot of the storage medium employed in the embodiment of FIGURE 1 has the various bits of each code configuration for a character stored in it;

FIGURES 3*a* and 3*b* are logical diagrams illustrative of the gating circuits employed in the determination of the direction of translation in the translator of FIGURE 1;

FIGURES 4*a* and 4*b* taken together are a timing diagram illustrating the various relationships according to a timed sequence in the translation from an origin code to a destination code in the translator of FIGURE 1;

FIGURE 5 is a block diagram of a second embodiment of a translator according to the principles of the invention; and FIGURE 6 shows the arrangement of the coded representations of a character in one slot of the storage medium of the translator of FIGURE 5.

Referring now to FIGURE 1, the principles of the invention are embodied in a code translator to accomplish conversion of the manifestation of a character expressed in an origin code into a manifestation of the same character expressed in a destination code. For purposes of explanation and to facilitate the understanding of this embodiment of the invention, it will be assumed that the origin code is Code A and the destination code is Code B as hereinafter described with respect to FIGURES 2*a* and 2*b*. Thus, it is also assumed that the translation occurs in the forward direction.

The character to be translated as expressed in the origin code is entered into a multiplexor 10. The multiplexor may be connected to a communication and/or data processing system (not shown) which supplies the characters for translation as well as address information concerning the destination code. Multiplexor 10 is connected to origin code circuitry through a gate circuit 16 and a coupling connection 17. This circuitry comprises an origin character register 11, serializer 12, origin serial comparator 13 and origin compare trigger 14. Multiplexor 10 is also connected through a gate circuit 25 and a coupling connection 26 to destination address circuitry. This circuitry comprises a destination address register 21, a serializer 22, a destination address serial comparator 23 and a destination address compare trigger 24. The origin character register 11 and destination address register 21 are also connected to control circuitry for determining whether the direction of translation is forward or backward. This circuitry comprises a forward-backward circuit 31 and logic circuitry indicated in dashed line block form at 30 for controlling the manner in which the translation takes place. The forward-backward circuit 31 is described more fully hereinafter in connection with the description of FIGURES 3*a* and 3*b*.

A closed loop continuous storage medium, such as the delay line 32, is employed to store all characters expressed in all codes. Although a delay line is described as the storage medium, it should be understood that other media, such as a shift register, may also be employed for storage of the coded characters. The delay line 32 is provided with a main section 33 and a tapped section 35 separated by a tapped output connection at 34. The normal output of the delay line at 28 from section 35 is connected through a storage regeneration circuit 39 to the delay line input at 29. The circuit 39 may be conventional in nature and may take the form of an AC trigger. This circuit accepts the stored characters emanating as signals from the delay line, regenerates them and feeds the information back into the delay line at 29.

The tapped section 35 of the delay line has a time duration equivalent to one slot time. As will be explained more fully hereinafter, the stored characters are arranged in time slots in the delay line. The number of time slots is, therefore, required to be at least equivalent to the number of characters stored, as each time slot may contain a character expressed in each of the stored codes.

A translate mode trigger 36 is also connected to the multiplexor 10. The connection is made through an AND gate 37 which also receives a clock signal. When activated, translate mode trigger 36 causes the translation operation to take place.

As stated above, the storage medium is divided into a plurality of time slots at least equivalent in number to the number of characters stored in the medium. Thus, as shown in FIGURE 2*a*, the delay line is divided into N slots and each slot contains a character expressed in M codes. Each character has a total of P bits of information which includes both address and data bits. The address bits are used for identifying the code. The various groups of information bits contained in each slot constitute a unique character expressed in M different codes.

As shown in FIGURE 2*b*, four codes are stored in the storage medium and are identified as the A, B, C and D codes. Since four codes are employed, two bits of information are required to give each code a unique address within the slot. The first two bit positions of each code expression correspond to these addresses and identify the particular code. Thus, the various codes A, B, C, D have the following identifying binary bit configurations: 00, 01, 10, 11, respectively. The remaining bit positions (eight in this illustration) carry the data of the particular character.

Translation of a character from one code to another involves the pairing of the character entered into the translator with the same character in a particular slot of the storage medium. The address of the destination code is then employed to control the direction of translation to the character expressed in the destination code. As a result, with the origin code being Code A, as already assumed, a translation to a destination code of Code B is in the forward direction. On the other hand, a translation of a character from a Code B expression to a Code A expression entails a backward translation and, hence, the actuation of different controls.

To illustrate, it has previously been mentioned that the tapped output at 34 from the delay line 32 is one time slot before the end 28 of the delay line. The section 35, therefore, is capable of containing the equivalent of one character expressed in each of the codes stored in the delay line. The provision of the tapped output at 34 permits the comparison of the contents of the delay line with the character entered into the translator from the multiplexor to be made early in time with respect to the delay line output. This enables a translated character to be removed from the delay line 32 at the tapped output 34 if the translation occurs in the forward direction or at the output 28 of the section 35 if the translation occurs in the backward direction. Thus, if suitable gating circuits are employed to control this mode of operation, the translated character is always available after a comparison is detected.

Referring again to FIGURE 1, the operation of the translator of the invention is now described in greater detail. When a character is entered into multiplexor 10 from a communication or data processing system, the multiplexor indicates that it has a character ready to translate. It provides this indication at the gate line 15 which is connected to the AND gate 16 located in the coupling connection 17 from the multiplexor 10 to the register 11. Thereafter, as shown in line 1 of the timing chart of FIGURE 4*a*, as the bit clock for the translator enters the timing period T8 in a section of a time slot, the AND gate 16 is enabled through the clock line permitting the character to be passed from the multiplexor through the line 17 to the origin character register 11.

Throughout the description of the operation of the invention, reference will be made to the bit clock which operates in predetermined periods of the sections of the time slots. The circuitry for providing the bit clock is not shown. However, it may take the form of a ring which provides timing pulses according to a particular sequence. As shown in FIGURES 4*a* and 4*b* groups of ten of these timing pulses cumulatively have a time duration equivalent to the assumed duration of one section of a time slot. Each one of these bit clock periods is referred to as a time period and corresponds to the duration of a bit position in the storage medium.

Concurrent with the passage of a character expressed in the origin code from multiplexor 10 to register 11, the AND gate 25 is also enabled by the signal provided by the mutiplexor through the line 27 and the clock signal appearing in time period T8. This permits the address of the character to be expressed in the destination code to pass from the multiplexor 10 through the coupling connection 26 to the destination address register 21.

In the next succeeding time period T9, the clock is applied to enable the gate 37 which connects the translate mode trigger 36 with the multiplexor 10. In this manner, the translator is put in the translate mode providing an output signal on the line 38 which is coupled to the origin compare trigger 14 through an AND gate 40. Concurrently, AND gate 40 is enabled (as shown on line 5 of FIGURE 4*a*) at time T0A by the clock signal. This clock signal reoccurs at each succeeding T0 time at the beginning of each section of a time slot. So long as the translate mode trigger 36 is in the translate mode, it provides a signal on line 38 which together with this clock signal enables the gate 40 to provide a set signal for the origin compare trigger 14.

The origin compare trigger 14 accepts this set signal and a reset signal provided by the origin serial comparator 13. Comparator 13 is connected to the tapped output at 34 of the main portion 33 of the delay line and to a serializer 12. As shown on line 6 of FIGURES 4*a* and 4*b* the comparator 13 is sampled in each time period to permit its output to appear on the reset line to trigger 14. The sampling avoids any race conditions arising from the mistiming of the signals from serializer 12 and output 34. The serializer 12 is connected to the origin character register 11 and to the clock line which activates it. The origin serial comparator may take the form of a conventional Exclusive-OR logical circuit which provides an up level output signal if no comparison occurs and a down level if a comparison occurs, as shown on line

7 of FIGURES 4*a* and 4*b*. The up level signal serves to reset the trigger 14 when a comparison does not take place between the character signals fed from the tapped output at 34 and the character signals fed from the register 11.

To illustrate this aspect of operation, reference may be made to the timing chart of FIGURE 4*a*. In the time slot sections indicated as 1 and 2, the line 3 illustrates the output from the delay line 32 at the tapped output 34 and the line 4 indicates the output from the serializer 12 and, thus, from the register 11. In the time period T0 of each of the sections 1 and 2, a mismatch occurs and a comparison does not take place in the comparator. Therefore, the trigger 14 is reset. This operation is shown on the line 7 of FIGURE 4*a*. In the third time section (FIGURE 4*b*) the signals on the lines 3 and 4 match and a comparison takes place in comparator 13. The output signal from comparator 13 is at the down level and the trigger 14 is not reset. As a result, the output from trigger 14 continues at an up level throughout the time section 3 and into the time section 4. This operation is illustrated by the line 8 of FIGURE 4*b*.

As shown at line 9 of FIGURES 4*a* and 4*b*, the AND gate 41 connecting the origin compare trigger 14 with a look for destination address trigger 42 is enabled by the clock signal during each T9B time period of each slot section. If the output from the trigger 14 is at the up level shown in slot section 3, AND gate 41 sets the trigger 42 at the T9B time period of this time section. Trigger 42 provides an up level output on the line 43. This line is connected to the gating circuitry 30 and also to the AND gates 44 and 45 which connect to the destination address compare trigger 24. Thus, when the up level output signal is provided on line 43 the gates 44 and 45 are enabled to set the trigger 24 if the clock is present or to reset the trigger if the output from comparator 23 is at an up level. (Refer to line 10.)

As already mentioned, the address portion of the character to be expressed in the destination code is supplied by the multiplexor 10 through the gate 25 to the destination address register 21 at the initiation of the operation of the code translator. The destination address register 21 continually sends this address through the serializer 22 to the destination address serial comparator 23. The comparator matches this address with the addresses of the codes stored in the delay line and supplied from the tapped output at 34 or the normal output at 28.

The characters stored in the delay line are supplied through either a forward AND gate 50 or a backward AND gate 51 and an OR circuit 52. The forward AND gate is connected to the tapped output at 34 of the delay line 32. The backward AND gate 51 is connected to the output 28 of the section 35 of the delay line 32. Each of the AND gates is also connected to the forward-backward circuit 31. Dependent on whether the translation is in the forward or backward direction, the corresponding line 53 or 54 is energized by an up level signal from the circuit 31 and the corresponding gate 50 or 51 is enabled to permit address information from the delay line to pass through the OR circuit 52 to the comparator 23.

The forward-backward circuit 31 is described more particularly hereinafter with reference to the description of the FIGURES 3*a* and 3*b*. This circuit receives the address information from the destination address register 21 and the origin character register 11 and determines the direction of character translation. In addition to enabling one of the gates 50 or 51, the signal provided on line 53 or line 54 is also applied to the gating circuit 30 to control other gate circuits. This aspect of operation will be described more fully hereinafter.

Referring now to FIGURES 3*a* and 3*b*, the forward-backward circuit 31 is a decoding circuit which employs two groups of AND and OR gate circuits to decode the addresses of the origin character and the destination character to indicate the direction of translation. The direction is indicated as a signal on either the line 53 or the line 54 for a forward translation or a backward translation, respectively. Each of the circuits of FIGURES 3*a* and 3*b* (for backward and forward translations respectively) discloses the use of three AND gates 90, 91, 92 and 93, 94, 95, respectively. Each AND gate receives two input signals. The output of each AND gate is connected to a respective OR gate 96, 97. The gates 96 and 97 provide the directional indication.

For the decoding operation, it has been assumed that the codes A, B, C, D as stored in the portion of the storage medium shown in FIGURE 2*b* have the respective addresses of 00, 01, 10, 11. From these addresses it is possible to determine the signal inputs which must be combined in the decoding circuits of FIGURES 3*a* and 3*b* to provide the indications of forward and backward translations. For example, it is possible to perform a backward translation from the Code D to the Code C or the Code B or the Code A. It can also be performed from the Code C to the Code B or the Code A and from the Code B to the Code A. If it is assumed that the code that is being translated <u>from</u> has an address of X2X1 and the code that is being translated <u>to</u> has an address of Y2Y1, then the complete logical expression for a backward translation B is as follows:

$$B=X2X1Y2Y1+X2X1Y2\overline{Y1}+X2X1\overline{Y2}Y1 +X2X1\overline{Y2}\,\overline{Y1}+X2\overline{X1}Y2\overline{Y1}+X2\overline{X1}\,\overline{Y2}Y1 +X2\overline{X1}\,\overline{Y2}\,\overline{Y1}+\overline{X2}X1\overline{Y2}Y1+\overline{X2}X1\overline{Y2}\,\overline{Y1} +\overline{X2}\,\overline{X1}\,\overline{Y2}\,\overline{Y1}+\overline{X2}X1\overline{Y2}\,\overline{Y1}+X2\overline{X1}Y2\overline{Y1} +X2X1\overline{Y2}\,\overline{Y1}$$

If this expression is simplified and the redundant terms are eliminated, it reduces to the following expression:

$$B=X2X1(Y2+\overline{Y2})+X2\overline{X1}\,\overline{Y2}+\overline{X2}X1\overline{Y2}\,\overline{Y1}+\overline{Y2}\,\overline{Y1}(\overline{X2}+X2)$$

This expression may be further simplified to:

$$B=\overline{Y2}\,\overline{Y1}+X2\overline{Y2}+X2X1$$

Thus, to perform the translation in the backward direction, it is necessary to enter the signals expressed by these terms into the respective AND gates 90, 91, 92 of FIGURE 3*a*. The OR gate 96 provides a signal at its output for connection to line 54 to indicate that a backward translation is taking place.

To perform a translation in the forward direction the inverse of the simplified backward function expression is taken. This yields the following logical expression for a forward translation F:

$$F=(Y2+Y1)(\overline{X2}+Y2)(\overline{X2}+\overline{X1})$$

This expression may be simplified to yield the following expression:

$$Y2\overline{X2}+Y1\overline{X2}+Y2\overline{X1}$$

These combinations of inputs are supplied to the AND gates 93, 94, 95 of FIGURE 3*b*. OR gate 97 then provides a signal on line 53 indicating that a translation is occurring in the forward direction.

It has previously been stated that the translation is in the forward direction from characters expressed in Code A to characters expressed in Code B. Thus, as shown on line 11 of FIGURES 4*a* and 4*b*, the forward translate line 53 is brought to an up level immediately after the start of operation. It remains there during the entire translation and until the registers 11 and 21 are reset. If the translation is in a backward direction from characters expressed in Code B to those expressed in Code A then the line 54 is energized.

The destination address compare trigger 24 is set by the input from AND gate 44. At each time T0A, the clock is applied to this AND gate and if a signal is simultaneously provided on line 43 from trigger 42 the AND gate 44 provides the set signal for the trigger 24. This aspect of operation is shown in FIGURES 4*a* and 4*b* on the lines 5 and 10. At the period T0 of slot section 4 the AND gate

44 is enabled to provide the set signal for trigger 24. This only occurs after a comparison has taken place for an entire time section in the origin compare circuitry including the comparator 13 and the trigger 14. The trigger 24 remains in the set state providing an output to the gating circuitry 30 until it is reset by a signal from AND gate 45.

As already stated, AND gate 45 is provided with a signal from the look for destination address trigger 42 through the line 43 in a T9 time period after a comparison has taken place in the origin compare circuitry. AND gate 45 is also supplied with an up level signal by comparator 23, if a comparison does not take place between the destination address supplied from the multiplexor 10 and a destination address supplied from the delay line 32. As long as a comparison is made between these addresses, the signal provided by gate 45 is at a down level which inhibits the resetting of trigger 24.

As shown in the timing diagram of FIGURE 4*b*, setting of the destination address compare trigger 24 is indicated on the line 15. Line 16 indicates the occurrence of a reset only after trigger 24 is set from the gate 45 if a comparison does not take place in the comparator 23. However, it has been assumed that a comparison has occurred and, therefore, there is no reset of the trigger 24. Line 17 shows the output provided by the trigger 24 to the gating circuit 30. After this trigger is set, its output remains at the up level until it is reset.

In producing the signal for the comparator 23, the serializer 22 is activated by the clock line at each T0 and T1 time period in each slot section as shown on line 13 of the timing diagram of FIGURES 4*a* and 4*b*. The serializer 22 accepts the address from the destination address register 21 and feeds it sequentially to comparator 23. In each T0 and T1 time period, a signal is generated by serializer 22 depending on the address in the register 21. Thus, in the code translation from the Code A to the Code B and using the illustrative addresses described in connection with FIGURES 2*a* and 2*b*, the address for the destination code, Code B, is 01. Therefore, the serializer continues to produce signal levels indicative of 01 each time that the address times T0 and T1 occur in each time section.

The address in the destination address register 21 always remains there and it is always serialized and sequentially provided each T0 and T1 time period. This address is then compared with the address provided by the delay line to the comparator 23. In the time sections 1–3 there is no need for the clock signal supplied to the serializer 22 as the enabling signal for gate 45 is not provided to indicate the absence of a comparison in the trigger 24. However, in the third time section, the look for destination address trigger 42 provides an up level signal on line 43 and, therefore, in the fourth time section, the serializer 22 receives the clock signal generating the address of the destination code for comparison in comparator 23 with the address from the delay line. As a comparison takes place the gate 45 does not provide the reset signal even though it is enabled.

After the destination address compare trigger 24 is placed in the set condition by the clocking supplied by the gate 44, at the T0 time period of time section 4 (line 15 of FIGURE 4*b*) the destination address serial comparator 23 is sampled as shown on line 14 of FIGURE 4*b*. The sampling is done to determine if the destination address supplied by the register 21 compares with the address supplied by the delay line. If they do, then the AND gate 45 is not activated to supply the reset signal.

As already mentioned, when the look for destination address trigger 42 is activated, a signal is provided on line 43 to the gating circuit 30. Specifically, this signal is supplied to the AND gates 60 and 61. Each of these AND gates also receives a signal dependent on whether the translation is in the forward or backward direction. It has already been assumed that the translation is in the forward direction and the forward translate line 53 is at an up level supplying a signal to gate 60 as shown at line 11 of FIGURES 4*a* and 4*b*. When the input to the AND gate 60 is raised in the middle of the T9 period of time slot 3, this AND gate is enabled to provide an up level signal to the AND gate 62. Since the backward translate line 54 is not providing a signal to AND gate 61, this gate is not enabled and, therefore, does not provide a signal for the AND gate 63. Each of the AND gates 62–63 is connected to one of a pair of AND gates 65–66 which control the passage of the character expressed in the destination code from the delay line to a deserializer 64.

The output of AND gate 62 is connected to AND gate 66 and the output of AND gate 63 is connected to AND gate 65. Thus, one of the AND gates 65, 66 is enabled. In the case of a forward translation, the gate 66 is enabled to permit signals indicative of the character to pass from the tapped output at 34 of the delay line. In the case of a backward translation the signals pass from the section 35 of the delay line through the gate 65 to the deserializer 64. This aspect of operation for a forward translation is shown on the line 18 of FIGURE 4. The other inputs to the AND gates 62 and 63 are provided by the destination address compare trigger 24 which as shown at line 17 of FIGURE 4*b* provide an up level signal in the slot section 4. Concurrent with the enabling of the gate 66, the register 11 is set (as shown on line 21 of FIGURE 4*b*) to enable the character as expressed in the destination code to be entered into the register.

The trigger 24 also provides its output signal to an AND gate 67 which is used to provide a reset signal. At each time T9B, the clock signal is applied to this AND gate and if the signal from trigger 24 is also present a reset signal is provided. This reset signal after being delayed at 74 for a short period of time is applied to reset trigger 24 at R, the translate mode trigger 36 at R and the look for destination address trigger 42 at R. This operation is shown on line 20 of FIGURE 4*b*. As soon as the translate mode trigger is reset, it provides a signal through a feedback line 68 to the multiplexor 10 indicating that the translation has been completed. Resetting of the translate mode trigger 36 causes the level of its output signal to drop as shown on line 22 of FIGURE 4*b*.

Prior to the resetting of the translate mode trigger, however, the character passed to the deserializer 64 is entered into the origin character register 11 in place of the character originally stored there. This is performed through suitable gating means (not shown) in the coupling connection 70. Thus, if the character is entered into the deserializer 64 in serial form, a single gating signal may be provided to enter the contents into the register 11 when the complete character is stored in the deserializer. From the registers 11 and 21, the translated character with destination address is supplied through the coupling connections 71 and 72 to the multiplexor 10 for connection to the communication and/or data processing system.

Referring now to FIGURE 5, a second embodiment of the invention provides for the code storage medium 75 to be divided into segments or slots 76 at least equivalent in number to the number of characters stored in the medium. A delay line may also be used for this storage medium. Each slot contains one character which is expressed in two codes. For example, (refer to FIGURE 6) if the Codes A and B are stored in the medium, character 1 is stored in the first slot in the A code as A1, then in the B code as B1 and then the A code is repeated as A1. In the second slot of the storage medium, character 2 of both codes is stored as follows: A2, B2, A2. The mode of storing the characters is repeated throughout the storage medium. One code always follows the other code and, therefore, regardless of the direction of translation from an A code to a B code or from a B code to an A code, the next expression of a code is the one that is desired.

A character to be translated is entered into a character register 80 through a line 81 from a multiplexor 82. The multiplexor may be connected to a data processing and/or communication system. The character for translation is stored in this register and is presented in serialized form to a serial compare circuit 83 after being serialized by a serializer 84. Each bit of the character is then compared with the bits of the characters of the same code stored in the storage medium 75 until a comparison is effected. As soon as comparison occurs for an entire character, a signal is provided by a gate generator 85 to an AND gate 86. Gate 86 is enabled permitting the next expression of a character to be passed from the storage medium to the character register 80 for removal from the translator.

In the operation of the circuit, the serial comparator 83 may take the form of an Exclusive-OR circuit which produces an output signal at one level in the absence of a comparison, but which changes its output to a second level on the occurrence of a comparison. The presence of a signal at the second level is utilized to trigger the generator 85. This same output can be applied through the line 88 to reset the character register 80. The character stored therein is discharged and the register is rendered ready to accept the translated character from the gate 86. When the entire character is transferred to the character register, the comparator 83 indicates the end of a comparison by a change in signal level. This change of signal triggers the generator 85 to the reset state. It also is utilized to shift the entire character out of the register 80 to the multiplexor 82 enabling the translator to accept a new character for translation.

In the description above, it has been assumed that the number of bits in each of the codes is equal. However, the translator is capable of accommodating different bit length codes and for providing for the successful comparison of these different bit length codes. For example, if the A code has a bit length of 8 bits and the B code has a bit length of 6 bits, suitable circuitry for the incrementing and decrementing type could be utilized in the multiplexor or associated with it for adding shift bits to equalize the length of the two codes and to permit the comparison to be made. To accommodate for this, the shorter length code (Code B) would have shift bits added to each character stored in the medium 75. In operation, as the translated character is coupled from the character registration 80 to the multiplexor 82, the circuitry could act on it to provide the true character without any shift bits.

Different bit length codes can also be accommodated in the translator by breaking each slot up into $2(2^{m-n})+1$ character sections, where $m$ is the number of bits in the longer code expression and $n$ is the number of bits in the shorter code expression. The code expressions are then arranged so that the last expression is always the same as the first. Thus, if the translation is from A code to B code or from B code to A code, the next expression in the character slot after a comparison is made is the desired one. The circuitry for incrementing or decrementing for shift bits can then be included in the translator itself.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A translator for converting a character of information expressed in a first code to the same character of information expressed in a second code, comprising means for retaining the character expressed in the first code and entered into the translator for translation into a second code, means divided into plural serially arranged storage locations for storing a library of characters expressed in the first and second codes (said means being divided into slots at least equivalent in number to the number of characters stored), each character as expressed in the first and second codes being serially stored by code as a unique group of information bits in one of the storage locations, means coupled to the retaining means and the storing means for comparing the character in the retaining means with the characters expressed in the first code and stored in the storing means until a comparison is effected, and control means responsive to the occurrence of a comparison to effect the translation of the character in the retaining means as expressed in the first code to the same character expressed in the second code.

2. The translator of claim 1, wherein each storage location for storing a character of information contains a number of bit positions for storing the character expressed in the first code equal to the number of bit positions for storing the same character expressed in the second code enabling the codes employed in the translation to have equal bit lengths.

3. A translator for converting a character of information expressed in a first code to the same character of information expressed in a second code, comprising means for retaining the character expressed in the first code and entered into the translator for translation into a second code, recirculating storage means for permanently storing the characters expressed in the first and second codes, said means being divided into plural storage locations at least equivalent in number to the number of characters stored, each character as expressed in both the first and second codes being serially stored by code in one of the storage locations, means coupled to the retaining means and the storing means for serially comparing the character in the retaining means with the characters expressed in the first code and stored in the storing means until a comparison is effected, and control means responsive to the occurrence of a comparison to effect the translation of the character in the retaining means as expressed in the first code to the same character expressed in the second code.

4. A translator for converting a character of information expressed in a plurality of bits in a first code to the same character of information expressed in a plurality of bits in a second code, comprising means for retaining the character expressed in the first code and entered into the translator for translation into a second code, recirculating storage means divided into plural serially arranged storage locations for permanently storing a library of characters expressed in the first and second codes, each character as expressed in the first and second codes being serially stored by code in one of the storage locations and each character as stored being divided into bits for an address portion to identify the code and bits for a data portion, means coupled to the retaining means and the storing means for serially comparing the bits of the character in the retaining means with the bits of the characters expressed in the first code and stored in the storing means until a comparison is effected, and control means responsive to the occurrence of a comparison to effect the translation of the character in the retaining means as expressed in the first code to the same character expressed in the second code enabling it to be discharged from the translator.

5. A translator for converting a character of information expressed in a plurality of bits in a first code to the same character of information expressed in a plurality of bits in a second code, comprising means for retaining the character expressed in the first code and entered into the translator for translation into a second code, a delay line storage medium for permanently storing the characters expressed in the first and second codes, said means being divided into time slots equivalent in number to the number of characters stored, each character as expressed in both the first and second codes being stored in one of the slots, and each character as stored being divided into bits for an address portion to identify the code and bits for a data portion, said storage medium including means coupled to the beginning and end of the medium for regenerating the characters in the medium, means coupled to the retaining means and the storage medium for serially comparing the bits of the characters in the retaining means with the bits of the characters expressed in the first code and stored in the storage medium until a comparison is effected, and control means responsive to the occurrence of a comparison to effect the translation of the character in the retaining means as expressed in the first code to the same character expressed in the second code enabling it to be discharged from the translator.

6. In a translator for converting a character of information expressed in a first code to the same character expressed in a second code and having means for retaining the character which is expressed in the first code and entered into the translator for translation into a second code coupled to comparing means and control means responsive to the occurrence of a comparison to effect the translation of the character in the retaining means as expressed in the first code to the same character expressed in the second code, the improvement comprising recirculating storage means divided into plural serially arranged storage locations for permanently storing a library of characters expressed in the first and second codes, each character as expressed in both the first and second codes being serially stored by code in one of the storage locations, said storage means being coupled to the comparing means to permit the comparing means to compare the character in the retaining means with the characters expressed in the first code and stored in the storing means until a comparison is effected.

7. In a translator for converting a character of information expressed in a plurality of bits in a first code to the same character of information expressed in a plurality of bits in a second code and having means for retaining the character expressed in the first code and entered into the translator for translation into a second code and serial comparing means coupled to the retaining means and control means responsive to the occurrence of a comparison in the serial comparing means to effect the translation of a character in the retaining means as expressed in the first code to the same character expressed in the second code enabling it to be discharged from the translator, the improvement comprising a delay line storage medium for permanently storing the characters expressed in the first and second codes, said means being divided into time slots equivalent in number to the number of characters stored each character as expressed in both the first and second codes being stored in one of the slots and each character as stored being divided into bits for an address portion to identify the code and bits for a data portion, said storage medium including means coupled to the beginning and end of the storage medium for regenerating the characters in the medium and said storage medium being coupled to the serial comparing means to enable the bits of the character in the retaining means to be compared with the bits of the characters expressed in the first code and stored in the storage medium until a comparison is effected.

8. In the translator of claim 7 wherein the delay line storage medium is provided with a tapped output which is one time slot before the end of the delay line thereby permitting a full character to be present in the portion of the delay line storage medium between the tapped output and the end of the delay line storage medium.

9. A translator for converting a character of information expressed in a plurality of bits in a first code to the same character of information expressed in a plurality of bits in a second code, comprising means for retaining the character expressed in the first code and entered into the translator for translation into a second code, means for permanntly storing the characters expressed in the first and second codes, said means being of the closed loop type and having a normal output coupled to an input and a tapped output, said means being divided into slots equivalent in number to the number of characters stored with the portion of the storing means between the tapped output and the normal output being equivalent to one slot, each character as expressed in both the first and second codes being stored in one of the slots and each character as stored being divided into bits for an address portion to identify the code and bits for a data portion, means coupled to the retaining means and to the tapped output of the storing means for serially comparing the bits of the character in the retaining means with the bits of the characters expressed in the first code and stored in the storing means until a comparison is effected, and control means coupled to the storing means and the retaining means and responsive to the occurrence of a comparison to effect the translation in the retaining means as expressed in the first code of the same character expressed in the second code enabling it to be discharged from the translator, said translation taking place in the forward direction if the first code precedes the second code in the storing means so that the character expressed in the second code is coupled to the retaining means from the storing means at the tapped output for discharge from the translator and said translation taking place in the backward direction if the first code follows the second code in the storing means so that the character expressed in the second code is coupled to the retaining means from the storing means at the normal output for discharge from the translator.

10. The translator of claim 9, wherein more than two codes are stored in the storing means with each character being expressed in all codes in the slot of the storing means permitting translation to take place among any two of the stored code expressions.

11. The translator of claim 9, wherein the slots of the storing means accommodate the characters expressed in at least two codes, the code expressions being of unequal bit lengths.

12. A translator for converting a character of information expressed in a plurality of bits in a first code to the same character of information expressed in a plurality of bits in a second code, comprising means for retaining the character expressed in the first code and entered into the translator for translation into a second code, means for permanently storing the characters expressed in the first and second codes, said means being divided into slots equivalent in number to the number of characters stored, each character as expressed in both the first and second codes being stored in one of the slots with the expression of the character first positioned in a slot being repeated as the last expression of the character in that slot, means coupled to the retaining means and the storing means for serially comparing the bits of the character in the retaining means with the bits of the characters stored in the storing means until a comparison is effected, and control means responsive to the occurrence of a comparison to effect the translation of the character in the retaining means as expressed in the first code to the same character expressed in the second code enabling it to be discharged from the translator, said character as expressed in the second code being located immediately after the character as expressed in the first code in the storing means.

13. The translator of claim 12, wherein the first and second codes are of unequal bit lengths and means are provided for adding equalizing bits to the characters as expressed in the shorter of the codes so that the storing means can accommodate the characters expressed in both codes.

14. A translator for converting a character of information expressed in a plurality of bits in an origin code to the same character of information expressed in a plurality of bits in a destination code, comprising means for accepting a character to be translated from the origin code into a destination code and for accepting the address of the destination code, a delay line storage medium for permanently storing the characters expressed in the origin and destination codes, said delay line having a tapped output and a normal output and being divided into slots equivalent in number to the number of characters stored, so that the duration of the delay line between the tapped output and the normal output is equivalent to one slot, each character as expressed in both the origin and destination codes being stored in one of the slots and each character as stored being divided into bits for an address portion to identify the code and bits for a data portion, origin character control circuitry connected to receive the character to be translated from the origin code for comparison with the characters stored in the delay line and appearing at the tapped output to provide an indication of a comparison between a stored character with the origin code and the character to be translated, logical control means coupled to the origin character control circuitry and the destination address control circuitry for determining if the direction of translation is forward or backward to provide an indication thereof, means responsive to the indication of the direction of translation to control the passage of the contents of the delay line storage medium from the tapped output to the destination address control circuitry if the translation is in a forward direction and from the normal output if the translation is in the backward direction, said destination address control circuitry being responsive to a comparison between the destination address supplied to the circuitry and to the like contents from the delay line storage medium to provide a manifestation of a comparison only if the origin character control circuitry provides an indication of a comparison, and means responsive to the manifestation of a comparison in the destination address control circuitry to effect the transfer tof the character expressed in the destination code from the delay line storage medium at the tapped output if the translation is in the forward direction and at the normal output if the translation is in the backward direction to the accepting means for discharge from the translator.

(References on following page)

References Cited

UNITED STATES PATENTS

| | | | |
|---|---|---|---|
| 3,031,650 | 4/1962 | Koerner | 340—174 |
| 3,201,780 | 8/1965 | Gryk | 340—347 |
| 3,201,782 | 8/1965 | Von Kummer | 340—347 |
| 3,218,631 | 8/1965 | Flieg et al. | 340—347 |
| 3,219,999 | 8/1965 | Smith | 340—347 |
| 3,221,158 | 11/1965 | Roth et al. | 235—164 |
| 3,268,875 | 8/1966 | Schaffer | 340—347 |

DARYL W. COOK, *Acting Primary Examiner.*

MAYNARD R. WILBUR, *Examiner.*

W. J. KOPACZ, *Assistant Examiner.*

UNITED STATES PATENT OFFICE

CERTIFICATE OF CORRECTION

Patent No. 3,354,450 November 21, 1967

John R. Carthew et al.

It is certified that error appears in the above identified patent and that said Letters Patent are hereby corrected as shown below:

Column 11, lines 1, 2 and 3, strike out "(said means being divided into slots at least equivalent in number to the number of characters stored)"; column 14, line 68, for "tof" read -- to --.

Signed and sealed this 15th day of July 1969.

(SEAL)
Attest:

Edward M. Fletcher, Jr.
Attesting Officer

WILLIAM E. SCHUYLER, JR.
Commissioner of Patents